United States Patent

[11] 3,556,438

[72] Inventor Ludwig F. Meditz
 419 E. 12th St., New York, N.Y. 10009
[21] Appl. No. 854,563
[22] Filed Sept. 2, 1969
[45] Patented Jan. 19, 1971

[54] AIRBORNE VEHICLE
 9 Claims, 5 Drawing Figs.

[52] U.S. Cl. .................................................... 244/4,
 244/17.23, 244/138
[51] Int. Cl. .................................................... B64c 29/00
[50] Field of Search ......................................... 244/4,
 17.11, 17.23, 7, 67, 138

[56] References Cited
UNITED STATES PATENTS
3,410,506 11/1968 Hayes .......................... 244/49(X)

FOREIGN PATENTS
607,588 7/1926 France .......................... 244/4.1
1,093,720 12/1967 Great Britain ................. 244/4

Primary Examiner—Milton Buchler
Assistant Examiner—Carl A. Rutledge
Attorney—Allison C. Collard ABSTRACT: An aircraft for transporting a single person through the air comprises a cradle for supporting that person, and a pair of electrically operated fan assemblies operatively connected to the cradle. The orientation of the fan assemblies is controlled from a console accessible to the passenger, thereby to control the flight of the aircraft. Means are provided to move the fans to an inoperative position in which they extend to the rear of the cradle and are disposed in an overlying relationship with respect to one another.

PATENTED JAN 19 1971
3,556,438
SHEET 1 OF 2
FIG.1
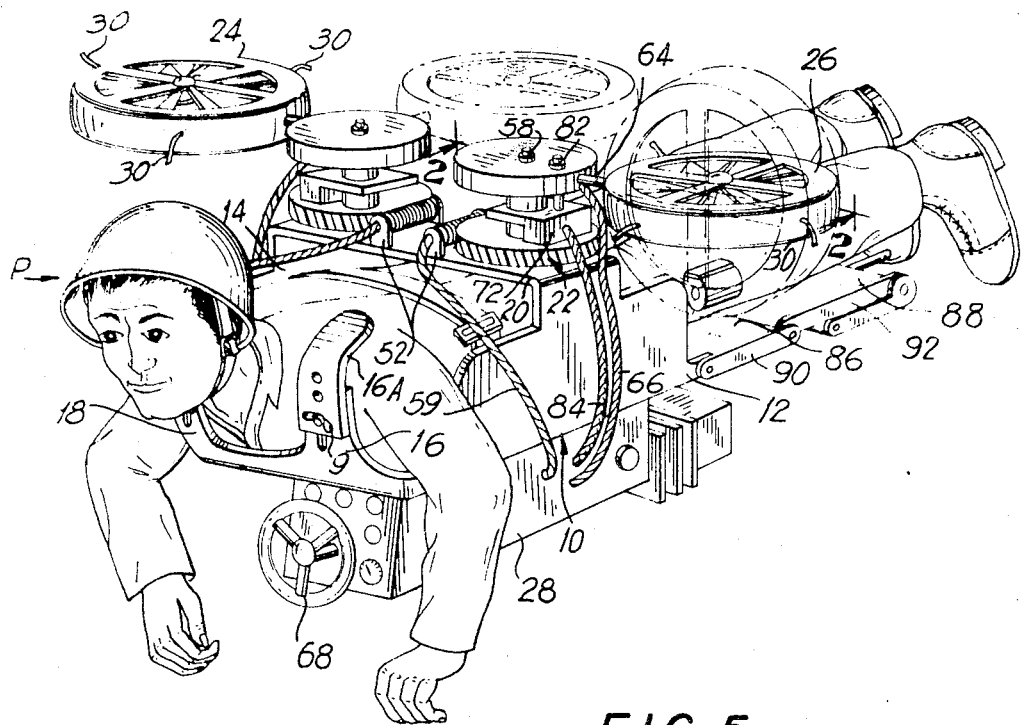
FIG.4
FIG.5
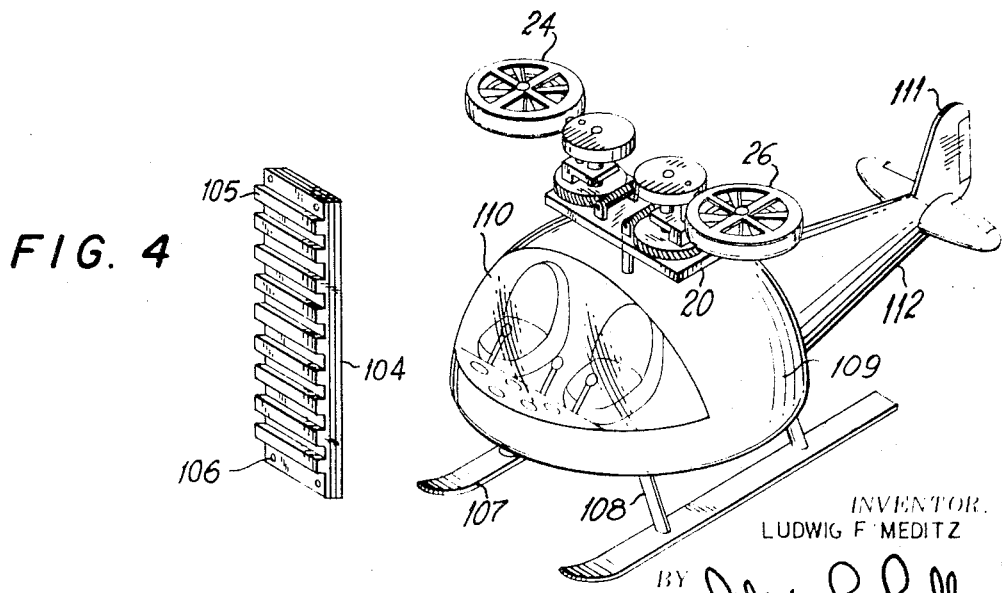
INVENTOR.
LUDWIG F. MEDITZ
BY
ATTORNEY

INVENTOR.
LUDWIG F. MEDITZ
BY
ATTORNEY 3,556,438

AIRBORNE VEHICLE

The present invention relates to aircraft, and particularly to a lightweight aircraft of the helicopter type which is capable of transporting a single passenger through the air.

Several efforts have been made in recent years to devise a lightweight, single passenger aircraft which is carried on the body of the passenger. While aircraft of this type have obvious applicability in military activities to enable the individual soldier to quickly traverse great distances, they are also highly desirable for use as pleasure craft.

These past efforts to provide such an aircraft have generally utilized gas turbine engines which derive their energy from a liquid fuel source. These engines and their accompanying fuel tank are typically relatively heavy and bulky, and hence are not well adapted to be conveniently carried by the passenger. Moreover, the relatively heavy weight of these aircraft necessitates an increased lift force and thus an increased capacity turbine.

Other problems that have arisen in the past attempts to develop a feasible portable aircraft have included the difficulty in obtaining reliable and accurate flight control and excessive cost and complexity of the aircraft engine and flight control apparatus. As a result, their aircraft have had only a relatively limited acceptance in both military and commercial applications.

In my copending application Ser. No. 840,313 entitled Electromagnetically Driven Lift Fan and Jet Engine, there is disclosed an efficient, lightweight, electrically operated motor as well as the use of that motor in a one-man aircraft of the helicopter type. While that aircraft is eminently satisfactory in many respects and provides many significant improvements over the gas turbine engine aircraft, it is relatively bulky and thus cannot be readily carried by the operator when not in flight. Moreover, the degrees of control of the aircraft are somewhat limited for its effective use in a wide number of flight operations.

It is an object of the present invention to provide a one-man aircraft which can be more readily carried on the person of the user when not in flight.

It is a further object of the present invention to provide a lightweight aircraft which has the capability of transporting a single person through the air in a reliably controlled manner.

The aircraft of the present invention comprises a cabin or cradle for supporting or containing the passenger. A pair of electrically operated rotary fan assemblies are operatively secured to the cabin or support. Means carried by the cabin or support are provided to supply sufficient drive to the fans to establish a sufficient lift force. Control means accessible to the passenger are provided to adjust the orientation of at least one of these fans, thereby to permit the passenger to control the flight of the aircraft. As herein described, each of the rotary fan assemblies are pivotable between a first, substantially horizontal position in which they supply maximum lift to the aircraft, to a second, substantially vertical position in which the rotary fan assemblies supply a forward thrust to the aircraft.

In one embodiment of the invention, the rotary fan assemblies are movable away from their operative positions in which they extend transverse to the cabin or the cradle, to a retracted position in which they are arranged longitudinally therealong in an overlying relation. To allow for the overlying condition means are provided to adjust the level of one of the fan assemblies with respect to the other, so as to permit the desired pivoting of one fan assembly over the other. In this position, the fan assemblies are in a stored condition and permit the aircraft to be carried in a relatively compact form, which provides a minimum hindrance to the individual on whose person the aircraft is carried.

For further comprehension of the invention and of the objects and advantages thereof, reference will be had to the following description and accompanying drawings and to the appended claims in which the various novel features of the invention are particularly set forth.

In the accompanying drawings forming a material part of this disclosure, wherein similar reference characters denote similar elements throughout the several views:

FIG. 1 is a perspective view of the aircraft of this invention shown carried in condition for flight on the person of its operator;

FIG. 4 is a perspective view of a pole piece used in the electrically operated rotary fan of the aircraft of FIG. 1 and FIG. 4; and FIG. 5 is a plan view of another embodiment of the invention for use in a cabin-type aircraft.

Figure 2:
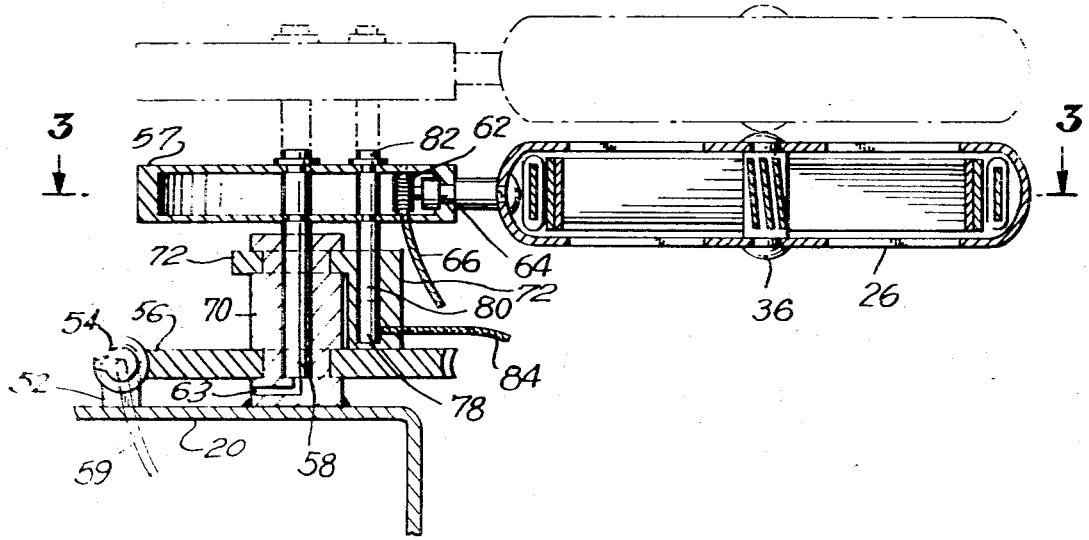
FIG. 2 is a cross-sectional view taken along the line 2—2 of FIG. 1.

The aircraft of the present invention is adapted for use as a one-man helicopter. As shown in FIG. 1, the aircraft comprises a cradle or support generally designated 10 which is preferably made of a lightweight material such as fiberglass and which is adapted to be fitted over the torso of the sole passenger and operator P. When used in flight the passenger lies in a prone position as shown in FIG. 1.

Cradle 10 comprises a base from which a pair of sidewalls 12 and 14, extend, and a pair of forward curved portions 16 and 18 shaped to fit snugly over the shoulders of passenger P. The curved portion 16A (and 18A, not shown) are adjustably mounted on portions 16 and 18 to accommodate the fit of passenger P, by adjustment of wingbolt 9.

A support plate 20 extends between the upper ends of sidewalls 12 and 14. The aircraft drive assembly, generally designated 22, is mounted on support 20. Assembly 22 comprises a pair of electrically operated rotary fan assemblies 24 and 26 which when operated provide sufficient lift and thrust forces to operate the aircraft.

As herein described, electrical power to operate the rotary fan assemblies 24 and 26 is provided by an electrical generator contained in a control unit 28 secured to the underside of cradle 10. Control unit 28 may include a self-contained internal combustion engine which drives a generator to provide multiphase AC electrical energy to the rotary fan assemblies through cables 30, connected to the stator windings of fans 24 and 26.

The rotary fan assemblies 24 and 26 are preferably constructed in accordance with the construction disclosed in my said copending application described above. Briefly described, the rotary fan assemblies 24 and 26 comprise an electric motor 32. That motor comprises a ring 34 rotatably mounted on a shaft 36 which in turn carries a hub 38. The ring 38 is carried by a plurality of radially extending preferably pitched blades or vanes 40 secured to hub 38. A plurality of magnetic pole pieces 42 are arranged about the periphery of ring 34.

The stator 44 of motor 32 comprises three-phase wound stator coils 46, 48 and 50 arranged about a suitable stator core 104. The generator supplies suitable three-phase electrical signals to the stator coils through conductors 30, and causes ring 34 along with blades 40 to rotate about shaft 36 in a known manner.

When motor 32 is operated in this manner, the rotation of the blades 40 in fan assemblies 24 and 26 creates a sufficient lifting force to raise the aircraft and the passenger. The rate of ascent of the aircraft depends upon the rotational speed of the rotary blades.

In accord with one aspect of the present invention, means, under the control of the passenger, are provided to adjust the orientation of the fan assemblies with respect to the horizontal, thereby to vary the direction of the force erected by the rotating fan blades. For takeoff when maximum lift is desired, the fan assemblies 24 and 26 both lie substantially horizontal. When the craft is aloft at a desired elevation the fan assemblies are pivoted about a horizontal axis to provide a forward thrust component so as to impart forward movement to the aircraft. For maximum forward speed and minimum lift, the fan assemblies are pivoted to the substantially vertical orientation indicated by the broken line position of fan assembly 26 in FIG. 1.

Figure 3:
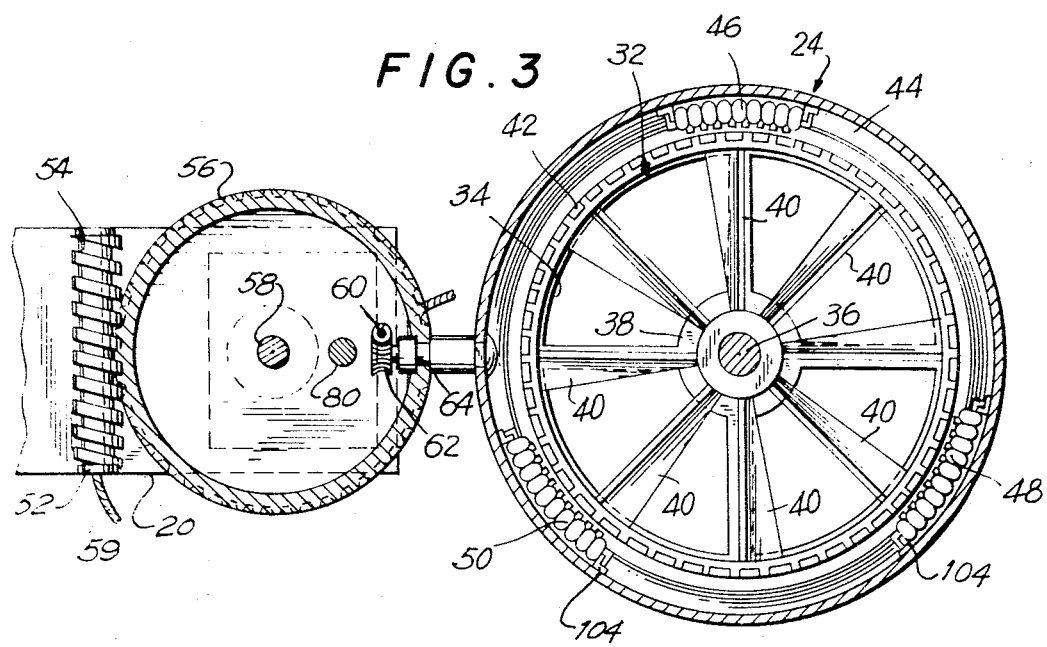
FIG. 3 is a cross-sectional view taken along the line 3—3 of FIG. 2.

As the adjusting mechanism for pivoting the fans is substantially identical both in construction and manner of operation for both fan assemblies 24 and 26 only that mechanism associated with fan assembly 26, shown in FIGS. 2 and 3, is herein described. That mechanism comprises a bracket 52 mounted on plate 20. A worm 54 is rotatably mounted between the upper ends of bracket 52 and meshes with a worm driven gear 56.

Gear 56 pivots around a central hub 70 which is secured or welded to bracket 20. An L-shaped member 72 has its vertical portion secured to a portion of the top surface of gear 56, and its horizontal portion pivotably retained around hub 70. Shaft 58 is slidably disposed along the axis of hub 70, and is secured at its free end to hollow drum 57. Shaft 80 is slidably disposed in L-shaped member 72 and is also secured by nut 82 to drum 57. A hydraulic line 84 is coupled into member 72 and is communicative to shaft 80. A worm 60, coupled to the end of flexible cable 66 and retained inside drum 57, engages a worm follower gear 62 which is secured on the end of shaft 64. The other end of shaft 64 which is pivotably coupled through drum 57 is bolted to stator 44 of fan 26.

Cable 66, which is connected to and driven by control unit 28, controls the horizontal and vertical pitch of fan 26 by its movement of worm 60 against gear 62. Likewise, cable 59, which is connected to and driven by control unit 28, regulates the horizontal position of fan 26. Thus, both fans 24 and 26 can be vertically or horizontally pitched, and can both be swiveled behind pilot P as shown in dotted lines in FIG. 1.

In addition to the above movements, fan 26 may also be elevated, as shown in dotted line in FIG. 2 by applying hydraulic pressure to line 84. The pressure in line 84 applied from control unit 28, will cause cylinder shaft 78 to raise the elevation of the entire fan assembly, including drum 57, to its dotted line position. When fan 26 is elevated, it may be retracted behind pilot P and swiveled over fan 24 so that both fans can be stored in a nested position when not in use. An air release passage 63 permits shaft 58 to be elevated without resistance. This permits greater freedom of movement of the passenger along the ground when the aircraft is inoperative. Control unit 28 includes a wheel 68 which is readily accessible to pilot P, and controls the speed of fans 24 and 26. Various push buttons on the front of control unit 28 adjacent to wheel 68 provide control of the pitch, and horizontal retraction of fans 24 and 26, and the elevation of fan 26 above bracket 20.

When in flight, the legs of the passenger rest on extension members 86 and 88. Extension member 86 is pivotably connected to the rear end of cradle 10 by an arm 90. A second arm 92 is pivotably connected to the free end of arm 90 and to one end of extension member 88. In use, as shown in FIG. 1, arms 90 and 92 are pivoted outwardly so that the members 86 and 88 are locked in the extended position shown. When the aircraft is not in flight, extension member 88 is folded over extension member 86 and both members are folded over and received beneath the cradle 10 where they are retained until it is desired to once again operate the aircraft at which time extension members 86 and 88 are folded outwardly and once again locked in their extended positions.

FIG. 4 is a detailed view of a laminated stator core 104 having mounting holes 106 on each of its ends. Core 104 includes spaced-apart parallel profiles which serve to space the windings of the stator.

FIG. 5 is another embodiment of the invention wherein a cabin 109 is coupled to the bottom of the above-described fan assembly. Cabin 109 includes a windshield 110 of transparent material, to provide visibility for the pilot, and also has a tail section 111, connected to the end of body portion 112. A pair of landing skids 107, which are mounted on legs 108, are supported below the cabin of the vehicle.

The present invention provides a lightweight aircraft which may be readily carried on the person of a single passenger when in flight and also when not is use. When in use, the passenger lies in a prone position on a cradle. The fan assemblies are placed in their transverse flight positions for flight, and electrical energy is supplied to the fan motors to cause their rotation and the resulting lift of the aircraft. Control of the flight is accomplished by controlling the relative orientation of the fan assemblies with respect to their horizontal initial lift position.

All parts of the aircraft are preferably formed of lightweight materials such as fiberglass, aluminum or the like, and where feasible, such as in drum 57, the parts are hollow to afford increased savings in weight. The use of the electrically operated fan assemblies in place of the conventional gas turbine drives, further decreases the overall weight of the aircraft and thus increases its usefulness as a single-passenger portable aircraft. Moreover, the aircraft is easily controlled in flight and thus lends itself to use in both military and commercial applications. While I have illustrated and described the preferred embodiment of my invention, it is to be understood that I do not limit myself to the precise construction herein disclosed and that various changes and modifications may be made within the scope of the invention.

I claim:

1. In an aircraft for use in transporting an individual through the air comprising a support for the passenger, first and second electrically operated fans articulatably mounted on said support, means for operating said fans to produce a sufficient lift for the aircraft, and means accessible to the individual, operatively connected to at least one of said fans, and effective when operated by the individual to adjust the relative orientation of said fans, thereby to control the flight of the aircraft.

2. The aircraft of claim 1, further comprising means operatively connected to said support and to one of said fans and effective when actuated to adjust the vertical position of said one of said fans with respect to the vertical position of the other said fans.

3. The aircraft of claim 2, in which said fans when in an operative position extend transversely to either side of said support, and further comprising means operatively connected thereto and effective when actuated to pivot said fans to an inoperative position in which said fans extend longitudinally along said support.

4. The aircraft of claim 3, in which said fans when in their inoperative positions lie in partial overlying relation with respect to one another.

5. The aircraft of claim 1, in which said fans when in an operative position extend transversely to either side of said support, and further comprising means operatively connected thereto and effective when actuated to pivot said fans to an inoperative position in which said fans extend longitudinally along said support.

6. The aircraft of claim 5, in which said fans when in their inoperative positions lie in partial overlying relation with respect to one another.

7. The aircraft of claim 6, in which said support further comprises an extension member operatively connected to the rear end of said support, said extension member being movable from a first position in which it extends longitudinally beyond the rear end of the support, to a second position in which it is retracted in said support.

8. The aircraft of claim 1, in which said support further comprises an extension member operatively connected to the rear end of said support, said extension member being movable from a first position in which it extends longitudinally beyond the rear end of the support, to a second position in which it is retracted in said support.

9. The aircraft of claim 2, in which said support further comprises an extension member operatively connected to the rear end of said support, said extension member being movable from a first position in which it extends longitudinally beyond the rear end of the support, to a second position in which it is retracted in said support.